United States Patent
Ooga et al.

(10) Patent No.: US 7,679,619 B2
(45) Date of Patent: Mar. 16, 2010

(54) DATA OUTPUTTING METHOD, DATA OUTPUTTING DEVICE, LIQUID CRYSTAL PANEL DRIVING DEVICE, AND LIQUID CRYSTAL DISPLAY DEVICE

(75) Inventors: Kouichi Ooga, Kanagawa (JP); Tsuyoshi Ichiraku, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 942 days.

(21) Appl. No.: 11/281,407

(22) Filed: Nov. 18, 2005

(65) Prior Publication Data
US 2006/0109276 A1    May 25, 2006

(30) Foreign Application Priority Data
Nov. 19, 2004    (JP)    ............... 2004-335998

(51) Int. Cl.
G09G 5/02    (2006.01)
(52) U.S. Cl. ............... 345/601; 345/98; 345/99; 345/100
(58) Field of Classification Search ............ 345/601, 345/530
See application file for complete search history.

(56) References Cited
U.S. PATENT DOCUMENTS

| | | | | |
|---|---|---|---|---|
| 5,121,195 A * | 6/1992 | Seki et al. | ............ | 358/515 |
| 5,576,560 A * | 11/1996 | Runaldue et al. | ........... | 257/208 |
| 6,118,905 A * | 9/2000 | Uehara et al. | ............ | 382/252 |
| 6,304,671 B1 * | 10/2001 | Kakutani | ............ | 382/167 |
| 6,342,898 B1 * | 1/2002 | Pettitt | ............ | 345/601 |
| 6,700,559 B1 * | 3/2004 | Tanaka et al. | ............ | 345/88 |
| 6,825,824 B2 * | 11/2004 | Lee | ............ | 345/89 |
| 6,931,426 B2 * | 8/2005 | Cho | ............ | 708/272 |
| 6,992,783 B1 * | 1/2006 | Sumiuchi | ............ | 358/1.15 |
| 7,379,073 B2 * | 5/2008 | Park et al. | ............ | 345/600 |
| 2003/0210217 A1 * | 11/2003 | Lee | ............ | 345/89 |
| 2005/0002563 A1 * | 1/2005 | Hoshuyama | ............ | 382/162 |
| 2005/0111046 A1 * | 5/2005 | Kurumisawa et al. | ...... | 358/3.06 |
| 2005/0206645 A1 * | 9/2005 | Hancock | ............ | 345/501 |

FOREIGN PATENT DOCUMENTS

| | | |
|---|---|---|
| JP | 5-64110 A | 3/1993 |
| JP | 7-222197 A | 8/1995 |
| JP | 2000-338935 A | 12/2000 |
| JP | 2001-143063 A | 5/2001 |
| JP | 2003-233812 A | 8/2003 |
| JP | 2004-109796 A | 4/2004 |

* cited by examiner

*Primary Examiner*—Xiao M Wu
*Assistant Examiner*—Maurice McDowell, Jr.
(74) *Attorney, Agent, or Firm*—Sughrue Mion, PLLC

(57) ABSTRACT

A data outputting method is provided which is capable of reducing a memory capacity of a LUT (Look-Up Table). Compressed data obtained by dropping low-order bits making up gray-level data is stored in a manner in which the compressed data can be accessed by high-order bits to be input to the LUT. High-order bits making up an address output from an address supplying unit are supplied to the LUT and low-order bits are supplied to a computing unit. The LUT outputs compressed gray-level data corresponding to the high-order bits and compressed gray-level data corresponding to data of (high-order bit+1). The computing unit outputs each of expanded gray-level data obtained by dividing data obtained by interpolation among one expanded gray-level data, another expanded gray-level data and, third expanded data for every high-order bit based on one compressed data, other compressed data, and lower-bits.

31 Claims, 5 Drawing Sheets

FIG.3

1A: Liquid Crystal Panel Driving Device

4A: LUT

| 8-Bit Address | Data |
|---|---|
| 00000000 | DATA9:0 |
| 00000001 | DATA9:0 |
| 00000010 | DATA9:0 |
| 00000011 | DATA9:0 |
| ... | ... |
| 11111111 | DATA9:0 |

2 — Address Supplying Section

High-order 8 Bits

Low-order 2 Bits

6 — Computing Section

8 — Gray-level Data Outputting Section

DATA OUTPUTTING METHOD, DATA OUTPUTTING DEVICE, LIQUID CRYSTAL PANEL DRIVING DEVICE, AND LIQUID CRYSTAL DISPLAY DEVICE

BACKGROUND OF THE INVENTION

1. Field of the Invention

The present invention relates to a data outputting method, a data outputting device using the method and a liquid crystal panel driving device and a liquid crystal device using the method and a device, and more particularly to the data outputting method capable of reducing a memory capacity of a Look-Up Table (hereinafter simply, a LUT) and of a memory and/or, of shortening time of transferring data, the data outputting device using the method, the liquid crystal panel driving method, the liquid crystal panel driving device and the liquid crystal displaying method and the liquid crystal display device using the method and the device.

The present application claims priority of Japanese Patent Application No. 2004-335998 filed on Nov. 19, 2004, which is hereby incorporated by reference.

2. Description of the Related Art

As a displaying method in an image display device such as a liquid crystal device or a like, conventionally, a multiframe method is employed. In the multiframe method, a LUT is used for displaying in every frame.

An example of known use of the LUT is explained by referring to FIG. 6. For example, 10-bit addresses are supplied to a LUT 14 from an address supplying section 12 and then gray-scale data is read from the LUT 14 and the read gray-scale data is fed from the gray-level data outputting section 18 to a gray-level controlling input port (not shown) for being placed under a display control of a liquid crystal panel. DATA 11:0 in a data column in FIG. 6 shows that its number of bits is 12.

Moreover, another example related to the LUT is a method for reducing a memory capacity of the LUT. This reducing method is disclosed in Japanese Patent Application Laid-open No. 2001-143063 (Patent Reference 1) in which, by inputting an input value obtained by dropping low-order bits making up input data and a value being larger by one (or smaller by one) than the input data so that two output values corresponding to the above two values are output from the LUT and, by performing interpolation between the two output values based on data made up of the dropped low-order bits, an output value corresponding to an original value is gained.

In the above Patent Reference 1, technology to solve problems in that, when an output value calculated by performing interpolation between two output values is obtained by the above reducing method, the LUT must be read twice is also disclosed. An image processing device using the above technology includes an input compressing section to compress input data X0 representing each pixel value of an input image and to output the compressed data X1 and to output an interpolated data X2, a LUT to output data Yx corresponding to the compressed data X1 fed from the input compressing section and related data Dy, and an interpolating section to interpolate the data Yx output from the LUT based on the interpolated data X2 fed from the input compressing section and the related data Dy fed from the LUT to output a desired output data Y0 and is so configured as to perform interpolation of the output data Yx by using the interpolated data X2 and related data Dy. Here, the related data Dy is data showing a relation between the data Yx output from the LUT and data Yx' corresponding to the compressed data X1' existing before or after the compressed data X1.

Other technologies to interpolate data output from a LUT are disclosed in Japanese Patent Application Laid-open Nos. Hei 7-222197 (Patent Reference 2) and 2004-109796 (Patent Reference 3). In the technology disclosed in the Patent Reference 2, interpolated data is produced by using an interpolation coefficient output from a LUT and low-order bits making up color signal data in the first colorimetric system and, by adding the produced interpolated data to main data output from the LUT, color signal data in the second calorimetric system is interpolated.

In the technology disclosed in the Patent Reference 3, high-order bits making up input data (target gray-level) and high-order bits making up input data (target gray-level) in a previous frame are input as an address to the LUT to make interpolated date be output from the LUT so that, based on the low-order bits of the output interpolated data and input data and low-order bits making up input data in a previous frame, correcting data is produced.

However, the above examples of using the LUT present problems. That is, when the number of gray-level displays is to be increased, a memory capacity to satisfy the increased number is required, which causes a large memory capacity and high costs. Though the method to reduce the memory capacity of the LUT to solve this problem is disclosed in the above Patent References 1, 2 and 3, and technologies to interpolate data to be output from the LUT are also disclosed. However, the Patent References 1, 2, and 3 do not suggest fully how the problems are solved.

That is, in the Patent References 1, 2 and 3, the example of the case in which the interpolation of data necessary to solve the specified technological issues is performed under a condition being closely and inseparably related to the technological problems of each of the issues is shown and the technology to interpolate output data of the LUT is also disclosed therein, however, no satisfactory suggestion is provided as to how data is interpolated from a view point of how memory capacity is to be reduced and/or how transfer speed of data is to be increased successfully.

SUMMARY OF THE INVENTION

In view of the above, it is an object of the present invention to provide a data outputting method capable of reducing a memory capacity of a LUT and a memory, a data outputting device using the method, a liquid panel driving method and a liquid panel driving device and a liquid crystal displaying method and a liquid crystal display using the method.

According to a first aspect of the present invention, there is provided a data outputting method for interpolating and outputting data based on an input address including:

a step of, when an address is input, generating a first memory address which is made up of a specified address high-order bit portion of the input address, and obtained by excepting a specified address low-order bit portion from the input address;

a step of reading from a data storing unit a first compressed data stored at the first memory address and a second compressed data stored at a second memory address associated with the first memory address, and the first compressed data and the second compressed data which each are compressed by excepting a specified low-order bit part from an original data;

a step of expanding the first compressed data and the second compressed data, based on the specified address low-order bit portion of the input address, the read first compressed data and the read second compressed data, to obtain a first expanded data and/or a second expanded data;

a step of performing interpolation between the first expanded data and the second expanded data to obtain at least one expanded interpolation data; and a step of outputting the at least one expanded interpolation data, and at least one of the first expanded data and the second expanded data.

In the foregoing, a preferable mode is one wherein the second memory address is corresponding to a higher address next to the first memory address.

Also, a preferable mode is one wherein the data storing unit is so configured as to enable a plurality of pieces of data to be read by one clock.

Also, another preferable mode is one wherein the data storing unit includes a memory which performs a double edging operation.

Also, still another preferable mode is one wherein a data count of the expanded interpolation data to be generated between the first expanded data and second expanded data is determined based on a bit count of the address low-order bit portion.

Also, a preferable mode is one wherein various kinds of the data each include gray-level data.

According to a second aspect of the present invention, there is provided a liquid crystal panel driving method for interpolating and outputting gray-level data based on an input address and driving a liquid crystal panel in accordance with the output gray-level data, the method including:

a step of, when an address is input, generating a first memory address which is made up of a specified address high-order bit portion of the input address, and obtained by excepting a specified address low-order bit portion from the input address;

a step of reading from a data storing unit a first compressed gray-level data stored at the first memory address and a second compressed gray-level data stored at a second memory address associated with the first memory address, and the first compressed gray-level data and the second compressed gray-level data which each are compressed by excepting a specified low-order bit part from an original gray-level data;

a step of expanding the first compressed gray-level data and the second compressed gray-level data, based on the specified address low-order bit portion of the input address, the read first compressed gray-level data and the read second compressed gray-level data, to obtain a first expanded gray-level data and/or a second expanded gray-level data;

a step of performing interpolation between the first expanded gray-level data and the second expanded gray-level data to obtain at least one expanded interpolation gray-level data;

a step of outputting the at least one expanded interpolation gray-level data, and at least one of the first expanded gray-level data and the second expanded gray-level data to drive the liquid crystal panel.

In the foregoing, a preferable mode is one wherein the gray-level data is gray-level data of an arbitrary pixel to be output based on temporary data of the arbitrary pixel on a line for an image and temporary data of pixels surrounding the pixel both being output according to the data outputting method.

According to a third aspect of the present invention, there is provided a liquid crystal displaying method for interpolating and outputting gray-level data based on an input address and driving a liquid crystal panel in accordance with the output gray-level data to display an image, the method including:

a step of, when an address is input, generating a first memory address which is made up of a specified address high-order bit portion of the input address, and obtained by excepting a specified address low-order bit portion from the input address;

a step of reading from a data storing unit a first compressed gray-level data stored at the first memory address and a second compressed gray-level data stored at a second memory address associated with the first memory address, and the first compressed gray-level data and the second compressed gray-level data which each are compressed by excepting a specified low-order bit part from an original gray-level data;

a step of expanding the first compressed gray-level data and the second compressed gray-level data, based on the specified address low-order bit portion of the input address, the read first compressed gray-level data and the read second compressed gray-level data, to obtain a first expanded gray-level data and/or a second expanded gray-level data;

a step of performing interpolation between the first expanded gray-level data and the second expanded gray-level data to obtain at least one expanded interpolation gray-level data;

a step of outputting the at least one expanded interpolation gray-level data, and at least one of the first expanded gray-level data and the second expanded gray-level data to drive the liquid crystal panel.

In the foregoing, a preferable mode is one wherein the first expanded gray-level data is correspondent to a first pixel, the second expanded gray-level data is correspondent to a second pixel, and the at least one expanded interpolation gray-level data is correspondent to at least one pixel between the first pixel and the second pixel.

According to a fourth aspect of the present invention, there is provided a data outputting device for interpolating and outputting data based on an input address including:

a data storing unit to store compressed data in advance;

a memory address generating unit, when an address is input, to generate a first memory address which is made up of a specified address high-order bit portion of the input address, and obtained by excepting a specified address low-order bit portion from the input address;

a reading unit to read from the data storing unit a first compressed data stored at the first memory address and a second compressed data stored at a second memory address associated with the first memory address, and the first compressed data and the second compressed data which each are compressed by excepting a specified low-order bit part from an original data;

a data expanding unit to expand the first compressed data and the second compressed data, based on the specified address low-order bit portion of the input address, the read first compressed data and the read second compressed data, to obtain a first expanded data and/or a second expanded data;

an interpolating unit to perform interpolation between the first expanded data and the second expanded data to obtain at least one expanded interpolation data; and an outputting unit to output the at least one expanded interpolation data, and at least one of the first expanded data and the second expanded data.

According to a fifth aspect of the present invention, there is provided a liquid crystal panel driving device for interpolating and outputting gray-level data based on an input address and driving a liquid crystal panel in accordance with the output gray-level data, the device including:

a data storing unit to store compressed gray-level data in advance;

a memory address generating unit, when an address is input, to generate a first memory address which is made up of a specified address high-order bit portion of the input address, and obtained by excepting a specified address low-order bit portion from the input address;

a reading unit to read from the data storing unit a first compressed gray-level data stored at the first memory address and a second compressed gray-level data stored at a second memory address associated with the first memory address, and the first compressed gray-level data and the second compressed gray-level data which each are compressed by excepting a specified low-order bit part from an original gray-level data;

a data expanding unit to expand the first compressed gray-level data and the second compressed gray-level data, based on the specified address low-order bit portion of the input address, the read first compressed gray-level data and the read second compressed gray-level data, to obtain a first expanded gray-level data and/or a second expanded gray-level data;

an interpolating unit to perform interpolation between the first expanded gray-level data and the second expanded gray-level data to obtain at least one expanded interpolation gray-level data; and an outputting unit to output the at least one expanded interpolation gray-level data, and at least one of the first expanded gray-level data and the second expanded gray-level data to drive the liquid crystal panel.

In the foregoing, a preferable mode is one wherein the gray-level data is gray-level data of an arbitrary pixel to be output based on temporary data of the arbitrary pixel on a line for an image and temporary data of pixels surrounding the pixel both being output by the data outputting device.

According to a sixth aspect of the present invention, there is provided a liquid crystal display device for interpolating and outputting gray-level data based on an input address and driving a liquid crystal panel in accordance with the output gray-level data to display an image, the device including:

a data storing unit to store compressed gray-level data in advance;

a memory address generating unit, when an address is input, to generate a first memory address which is made up of a specified address high-order bit portion of the input address, and obtained by excepting a specified address low-order bit portion from the input address;

a reading unit to read from the data storing unit a first compressed gray-level data stored at the first memory address and a second compressed gray-level data stored at a second memory address associated with the first memory address, and the first compressed gray-level data and the second compressed gray-level data which each are compressed by excepting a specified low-order bit part from an original gray-level data;

a data expanding unit to expand the first compressed gray-level data and the second compressed gray-level data, based on the specified address low-order bit portion of the input address, the read first compressed gray-level data and the read second compressed gray-level data, to obtain a first expanded gray-level data and/or a second expanded gray-level data;

an interpolating unit to perform interpolation between the first expanded gray-level data and the second expanded gray-level data to obtain at least one expanded interpolation gray-level data; and an outputting unit to output the at least one expanded interpolation gray-level data, and at least one of the first expanded gray-level data and the second expanded gray-level data to drive the liquid crystal panel.

In the foregoing, a preferable mode is one wherein the first expanded gray-level data is correspondent to a first pixel, the second expanded gray-level data is correspondent to a second pixel, and the at least one expanded interpolation gray-level data is correspondent to at least one pixel between the first pixel and the second pixel.

With the above configurations, when a data storing unit is searched by using addresses to be input to output data corresponding to the addresses, compressed data, out of pieces of data, obtained by dropping low-order bits making up first data for every first address out of the addresses is stored in the data storing unit in a manner in which the compressed data can be accessed by high-order bits making up the first address and the high-order bits are input to the data storing unit and compressed data designated by the input high-order bits is read from the data storing unit and second compressed data designated by high-order bits having a specified relation to the input high-order bits is read from the data storing unit, and data obtained by performing interpolation between first expanded data and second expanded data based on the low-order bits making up an address and the read first and second compressed data is sequentially output and, therefore, a memory capacity of the LUT required for obtaining data being equivalent to data that existed before being compressed can be greatly reduced. This enables reduction in costs for the memory. Use of the method of reducing the memory capacity for the production of gray-level data can achieve multi gray-level display equal to the display achieved without reducing the memory capacity at the same time when the above effects are being obtained.

BRIEF DESCRIPTION OF THE DRAWINGS

The above and other objects, advantages, and features of the present invention will be more apparent from the following description taken in conjunction with the accompanying drawings in which:

FIG. 3 is a block diagram showing electrical configurations of a liquid crystal panel driving device making up a liquid crystal display device according to a second embodiment of the present invention;

DETAILED DESCRIPTION OF THE PREFERRED EMBODIMENTS

Best modes of carrying out the present invention will be described in further detail using various embodiments with reference to the accompanying drawings.

First Embodiment

Figure 1:
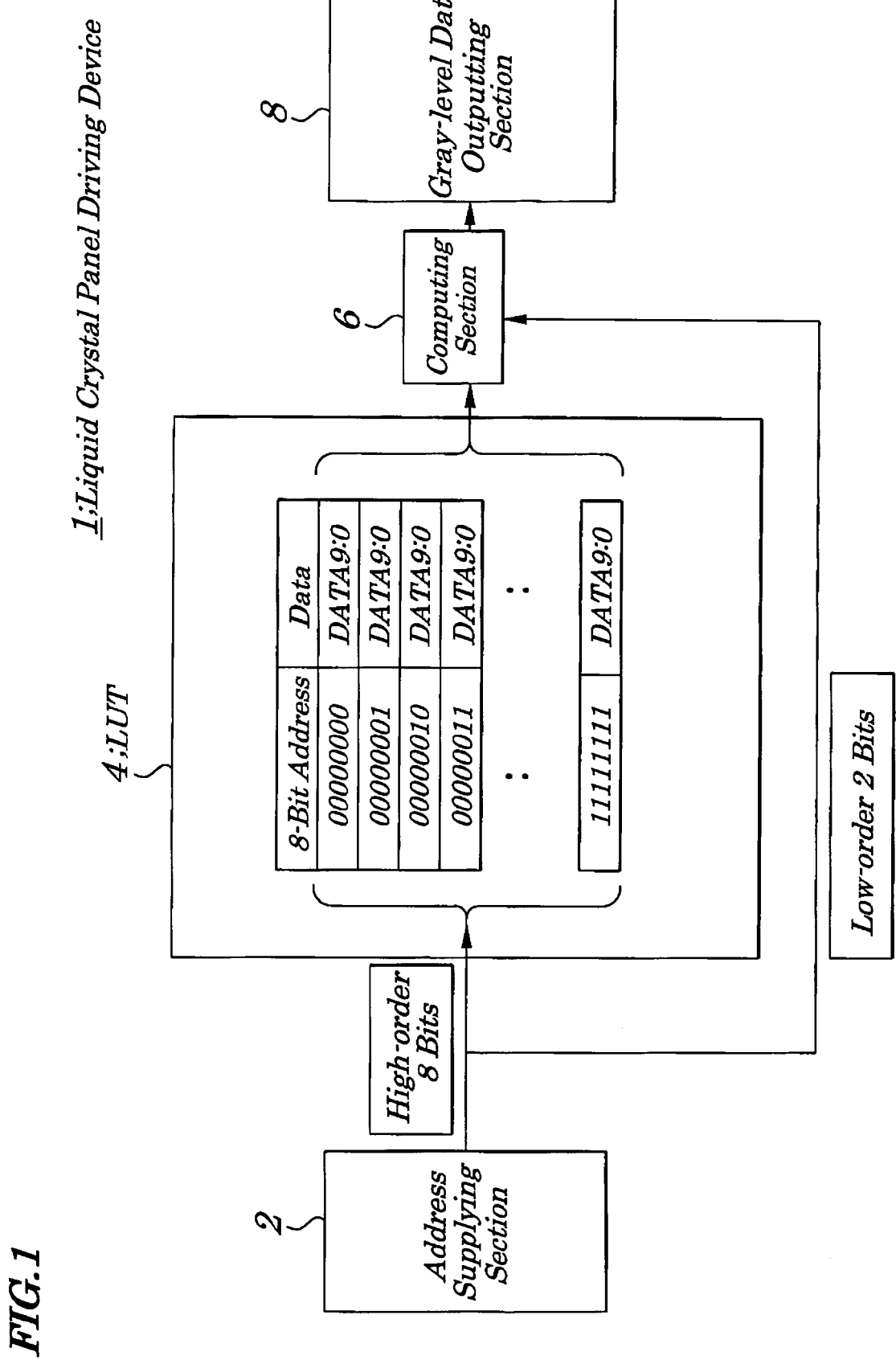
FIG. 1 is a block diagram showing electrical configurations of a liquid crystal panel driving device making up a liquid crystal display device according to a first embodiment of the present invention.
Figure 2:
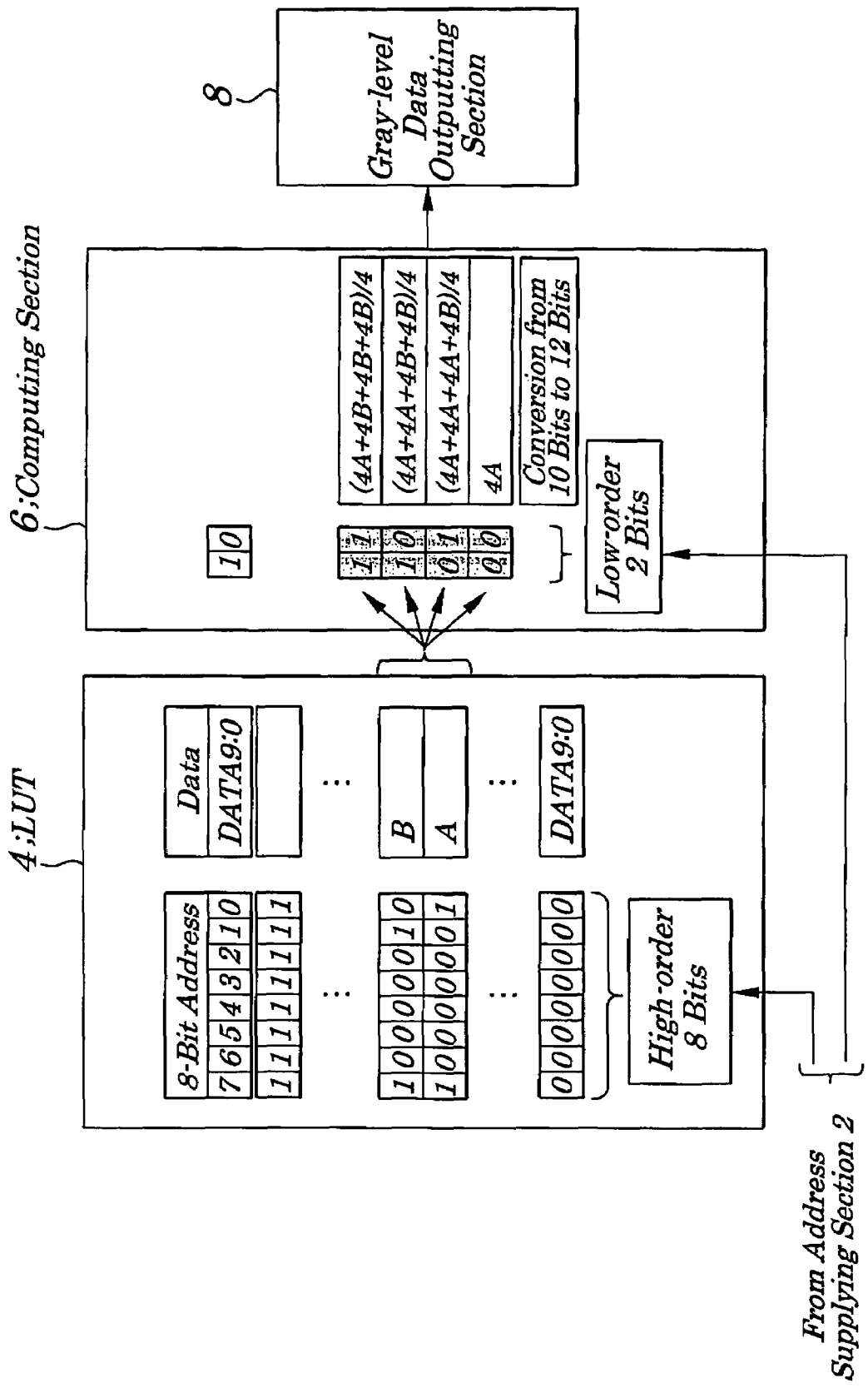
FIG. 2 is a diagram explaining outputting of gray-level data produced by the liquid crystal panel driving device according to the first embodiment.

FIG. 1 is a black diagram showing electrical configurations of a liquid crystal panel driving device making up a liquid crystal display device of a first embodiment of the present invention. FIG. 2 is a diagram explaining outputting of gray-level data produced by the liquid crystal panel driving device according to the first embodiment of the present invention.

The liquid crystal panel driving device 1, as shown in FIG. 1, includes an address supplying section 2, a LUT 4, a computing section 6, and a gray-level data outputting section 8 and operates so as to read gray-level data (hereinafter called "compressed gray-level data") obtained by dropping low-order bits corresponding to high-order bits out of bits making up an address to be input and to high-order bits being higher by one than the high-order bits, from the LUT 4 and, by performing interpolation between two pieces of gray-level data (hereinafter called "expanded gray-level data") obtained by expanding each of the above compressed gray-level data by using two pieces of compressed gray-level data and the low-order bits, produces the expanded interpolation gray-level data being analogous to gray-level data existing before being compressed to sequentially output the expanded gray-level data.

The address supplying section 2 separates addresses that can designate each of gray-level data required for driving a liquid crystal panel (not shown) into high-order bits and low-order bits for outputting. The addresses are output from the address supplying section 2 in a manner to correspond to a pixel in each frame. For example, when each of the addresses is made up of 10 bits, the high-order bits are 8 bits and the low-order bits are 2 bits. The address supplying section 2 supplies the high-order bits to the LUT 4 and the low-order bits to the computing section 6. The LUT 4 stores compressed gray-level data expressed by high-order bits for every high-order bits to be input in a manner in which the compressed gray-level data can be read by the high-order bits. The LUT 4 is configured so that, when high-order bits (LUT reading address) of all the bits making up a specified address of addresses that can address each of gray-level data required for driving the liquid crystal panel (not shown) are supplied as a first LUT reading address from the address supplying section 2, first compressed gray-level data stored in the first LUT reading address and second compressed gray-level data stored at a second reading address being higher by one than the first LUT reading address can be read. The first and second compressed gray-level data that can be read from the LUT 4 is fed to the computing section 6.

The computing section 6 is configured so that, when low-order bits (obtained by removing the high-order bits from all the bits making up the specified address), the first compressed gray-level data and the second compressed gray-level data are supplied thereto, interpolation is performed between a first expanded gray-level data obtained by expanding the first compressed gray-level data by a multiple determined by the above low-order bits and a second expanded gray-level data obtained by expanding the second compressed gray-level data by a multiple determined by the above low-order bits using the low-order bit and the first and second compressed gray-level data. And a specified count of the expanded gray-level data produced by performing the interpolation, which are analogous to gray-level data existing before being compressed and having a data count to be determined by the count of low-order bits, are sequentially output.

For example, as shown in FIG. 2, in the case where the above address is made up of 10 bits, its high-order bits are 8 bits and its low-order bits are 2 bits, when first compressed gray-level data "A" is read from the 8 high-order bits (that is, the first LUT reading address) in the LUT 4 and second compressed gray-level data "B" is read from the second LUT reading address being higher by one than the first LUT reading address in the LUT 4, the computing section 6 outputs sequentially a first expanded gray-level data "4A" and the following three expanded interpolation gray-level data that have been obtained by interpolating intermediate (pixel) data between the first expanded gray-level data "4A" and a second expanded gray-level data "4B", based on the low-order bits and the first compressed data "A" and the second compressed data "B".

Out of the three pieces of expanded interpolation gray-level data, first expanded interpolation gray-level data is data (4A+4A+4A+4B)/4, interpolated second expanded gray-level data is data (4A+4A+4B+4B)/4, and third expanded interpolation gray-level data is data (4A+4B+4B+4B)/4.

These expanded gray-level data each become gray-level data being analogous to corresponding gray-level data occurring before being compressed.

The gray-level data outputting section 8 supplies expanded gray-level data sequentially output from the gray-level data computing section 6 to an input port of the liquid crystal panel. For example, in the case where an address is made up of 10 bits, high-order bits (making up the LUT reading address) are 8 bits, and low-order bits are 2 bits, the first expanded gray data "4A" obtained by expanding four times the above first compressed gray-level data "A" to be read by the high-order bits (as the LUT reading address) and the three pieces of expanded gray-level data obtained by interpolation which each includes data (4A+4A+4A+4B)/4, (4A+4A+4B+4B)/4, and (4A+4B+4B+4B)4 are supplied to the input port of the liquid crystal panel from the gray-level data outputting section 8.

Here, as is apparent from the above description, the second compressed data "B" is compressed gray-level data to be read from the second LUT reading address which is fed to the LUT 4 and is larger by one than the first LUT reading address from which the first compressed data "A" has been read.

Next, operations of the liquid crystal panel driving device 1 according to the first embodiment are described by referring to FIGS. 1 and 2.

High-order bits making up an address (LUT reading address) to be output from the address supplying section 2 is supplied to the LUT 4. In the description described below, it is presumed that the address (corresponding to a pixel in each frame) is made up of 10 bits, and 8 bits of the high-order bits in 10 bits are used as the LUT reading address. If the 8 high-order bits fed to the LUT 4, that is, the first LUT reading address is, for example, 10000001 (see FIG. 2), the first compressed gray-level data "A" is read from the first LUT reading address, and the second compressed gray-level data "B" is read from a second LUT reading address being higher by one than the first LUT reading address, that is, from 10000010 (see FIG. 2). Both the compressed gray-level data "A" and the second compressed data "B" are supplied to the computing section 6. The compressed gray-level data "A" and the second compressed data "B" are data made up of 10 bits obtained by dropping, for example, the 2 low-order bits. The DATA 9:0 in a data column shown in FIGS. 1 and 2 shows that the number bits of data is 10 bits.

The computing section 6 produces first the first expanded gray-level data "4A" and the second expanded gray-level data "4B". More specifically, the compressed gray-level data "A" and the second compressed data "B" each being made up of 10 bits are expanded (converted) to be the first expanded gray-level data "4A" and the second expanded gray-level data "4B" made up of 12 bits. The computing section 6 initially outputs the first expanded gray-level data "4A" and then also outputs three expanded interpolation gray-level data produced by performing interpolation between the first expanded gray-level data "4A" and the second expanded gray-level data "4B" based on the first expanded gray-level data "4A" and the second expanded gray-level data "4B" and the 2 low-order bits, sequentially in decreasing order of size of data value. The three expanded interpolation gray-level data are, for example, three expanded gray-level data obtained by dividing data between the first expanded gray-level data "4A" and the second expanded gray-level data "4B" into quarters which include data (4A+4A+4A+4B)/4 as its first expanded interpolation gray-level data, data (4A+4A+4B+4B)/4 as its second expanded interpolation gray-level data, and data (4A+4B+4B+4B)/4 as its third expanded interpolation gray-level data, which are output in this order.

The timing of the outputting in this order is the same as the conventional outputting timing. That is, the above output timing in order is the same as the timing in the conventional putting method with which four non-compressed gray-level data corresponding to the above first compressed gray-level data "A", first expanded gray-level data, second expanded gray-level data, third expanded gray-level data is stored in the LUT 4 and four non-compressed gray-level data are sequentially read by sequentially feeding the address made up of the above 10 bits.

The above LUT 4 operates in the same manner as for all the high-order bits. The computing section 6 operates to perform computing also in the same manner as for the computation to be performed on the two compressed gray-level data to be read from the LUT 4 and on each of the low-order bits making up the two compressed gray-level data. However, in the case of the 8 highest-order bits and 2 low-order bits making up the address supplied from the address supplying section 2, the computing section 6 performs a different operation; that is, the computing section 6 outputs expanded gray-level data of compressed gray-level data to be read from the LUT 4 by the 8 bits.

Thus, the number of bits making up an address of gray-level data that originally requires the LUT 4 is decreased by 2 bits and the number of bits making up the gray-level data that originally requires the LUT 4 is decreased by 2 bits and, therefore, the memory capacity of the LUT 4 is reduced to 1/16th compared with a case in which gray-level data is obtained by accessing by 10-bit address. As a result, gray-level data in which gray-level luminance of expanded gray-level data that can be achieved in the present invention is made to fall within a range being able to be allowed for gray-level luminance of gray-level data obtained by accessing to the LUT 4 by the address made up of 10 bits, that is, gray-level data in which an influence on a gray-level luminance curve is suppressed up to an allowable limit for the above setting of automatic interpolation can be obtained.

As described above, gray-level data (interpolated and/or expanded gray-level data) output from the computing section 6 is supplied to the gray-level data outputting section 8 from which the gray-level data is fed to an input port of gray-level control of the liquid crystal panel and is used for display control of the liquid crystal panel.

Thus, according to configurations of the first embodiment, by accessing the first compressed gray-level data "A" corresponding to the first LUT reading address by using the high-order bits making up an input address (LUT reading address) from the LUT 4 and the second compressed gray-level data "B" corresponding to the second LUT reading address being larger by one bit than the first LUT reading address by using the high-order bits making up the input address; that is, by accessing these compressed gray-level data with the address bits reduced (with the LUT reading address being compressed) and, by performing interpolation, based on the first compressed gray-level data, the second compressed gray-level data and the low-order bits making up the above input address, between the first expanded gray-level data obtained by multiplying the first compressed gray-level data "A" by an inverse number of a compressing ratio and the second expanded gray-level data obtained by multiplying the second compressed data "B" by the inverse number of the compressing ratio to produce a plural pieces of the expanded interpolation gray-level data and, by producing the expanded interpolation gray-level data which bears comparison with a case in which gray-level data corresponding to all bits making up the above address is stored in the LUT 4, that is, by producing the gray-level data in which an influence on a gray-level luminance curve is suppressed up to an allowable limit for the above setting of interpolation, the memory capacity of the LUT 4 required for obtaining necessary gray-level data can be greatly reduced. This also can reduce costs for the memory. Moreover, with these effects described above still maintained, multi gray-level display that is equal to that obtained in a case where a memory capacity is not reduced can be also achieved. In this case, accuracy of the multi gray-level display depends on interpolation accuracy.

Second Embodiment

FIG. 3 is a block diagram showing electrical configurations of a liquid crystal panel driving device 1A making up a liquid crystal display device according of a second embodiment of the present invention. Configurations of the second embodiment differ greatly from those in the first embodiment in that a LUT 4A is configured so that two pieces of data are read by the same clock.

That is, the liquid crystal panel driving device 1A according to the second embodiment, as shown in FIG. 3, uses a memory that performs a double edging operation for the LUT 4A. Configurations other than described above are the same as those employed in the first embodiment and same reference numbers are assigned to components having the same function as those in the first embodiment and their descriptions are omitted accordingly.

Next, operations of the second embodiment are explained by referring to FIG. 3. Operations other than described below are the same as those explained in the first embodiment. Operations being different from those in the first embodiment are described. Other operations become apparent by referring to descriptions in the first embodiment and their descriptions are omitted accordingly. In the second embodiment, as in the case of the first embodiment, as a concrete example, the number of bits making up an address to be fed from an address supplying section 2 is 10 and 8 high-order bits (LUT reading address) out of 10 bits are fed to the LUT 4A and low-order 2 bits are fed to a computing section 6.

The LUT 4A differs from the LUT 4 in only that the LUT 4A has a memory to perform double edging operations and the LUT 4 does not. Data to be stored in the memory is compressed gray-level data as in the case of the first embodiment. A way of storing compressed gray-level data is the same as that in the first embodiment and the compressed gray-level data to be read from the memory is the same as in the first embodiment, however, in the second embodiment, two pieces of compressed gray-level data are read by one clock. This is only the point being different from that in the first embodiment. The compressed gray-level data read as described above is fed to the computing section 6 in the second embodiment.

As in the case of the first embodiment, low-order bits are fed to the computing section 6. The computing section 6 performs interpolating computation in the same manner as in the first embodiment to produce expanded gray-level data for outputting. The produced expanded gray-level data is supplied from the gray-level data outputting section 8 to a gray-level controlling input port of the liquid crystal panel for use in display control of the liquid-crystal panel.

Thus, according to the second embodiment, compressed gray-level data "A" corresponding to the LUT reading address and compressed gray-level data "B" corresponding to the LUT reading address being by one bit larger than the LUT reading address are accessed from the LUT 4A by high-order bits (LUT reading address) making up an input address. The LUT 4A is configured so that the address bits required for the LUT 4A is reduced, and the LUT 4A to which access is made with the LUT reading address compressed has a memory to perform a double edging operation and, therefore, the same effect as obtained by the first embodiment can be achieved also in the second embodiment and two pieces of compressed gray-data can be read by one clock. This enables improvement of data transfer speed from the liquid crystal panel driving device, that is, data transfer time can be shortened.

Third Embodiment

Figure 4:
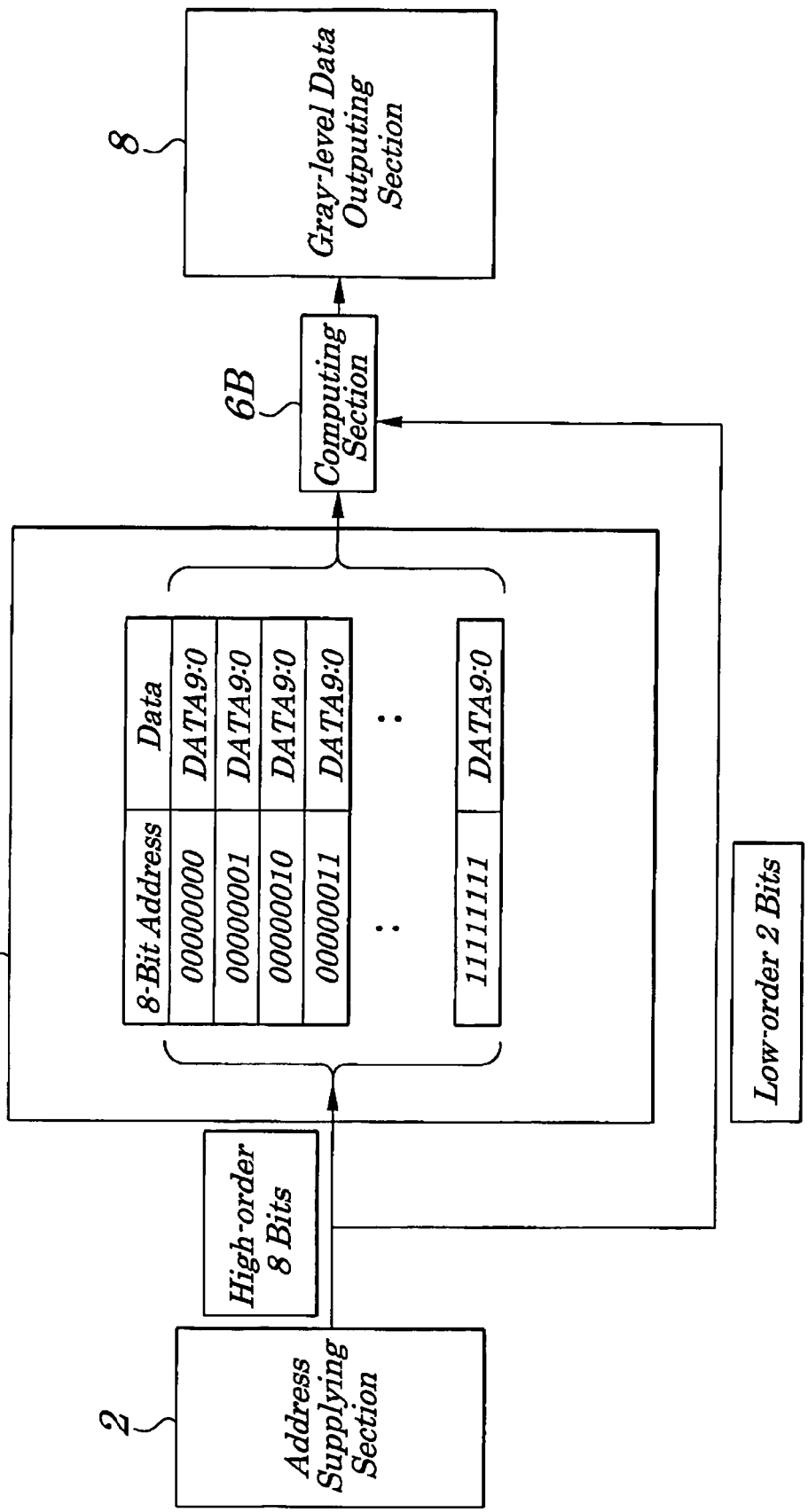
FIG. 4 is a block diagram showing electrical configurations of a liquid crystal panel driving device making up a liquid crystal display device according to a third embodiment of the present invention.
Figure 5:
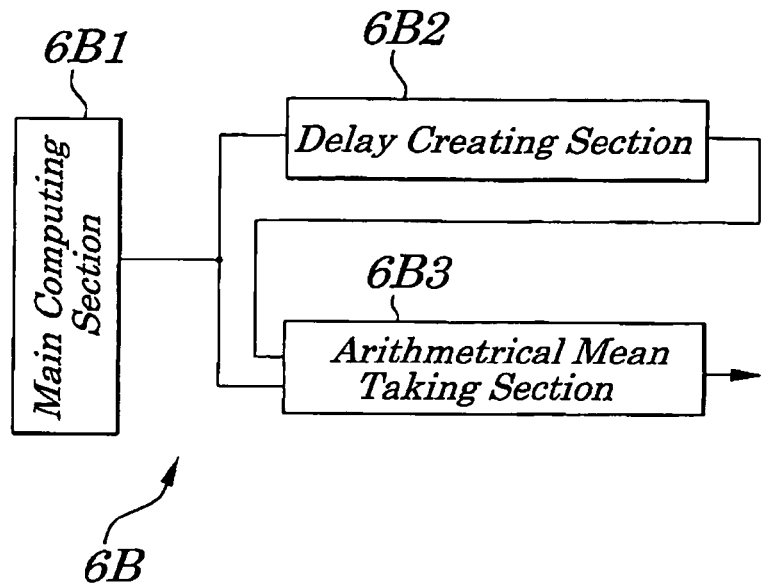
FIG. 5 is a diagram showing configurations of a computing section of the liquid crystal panel driving device according to the third embodiment.
Figure 6:
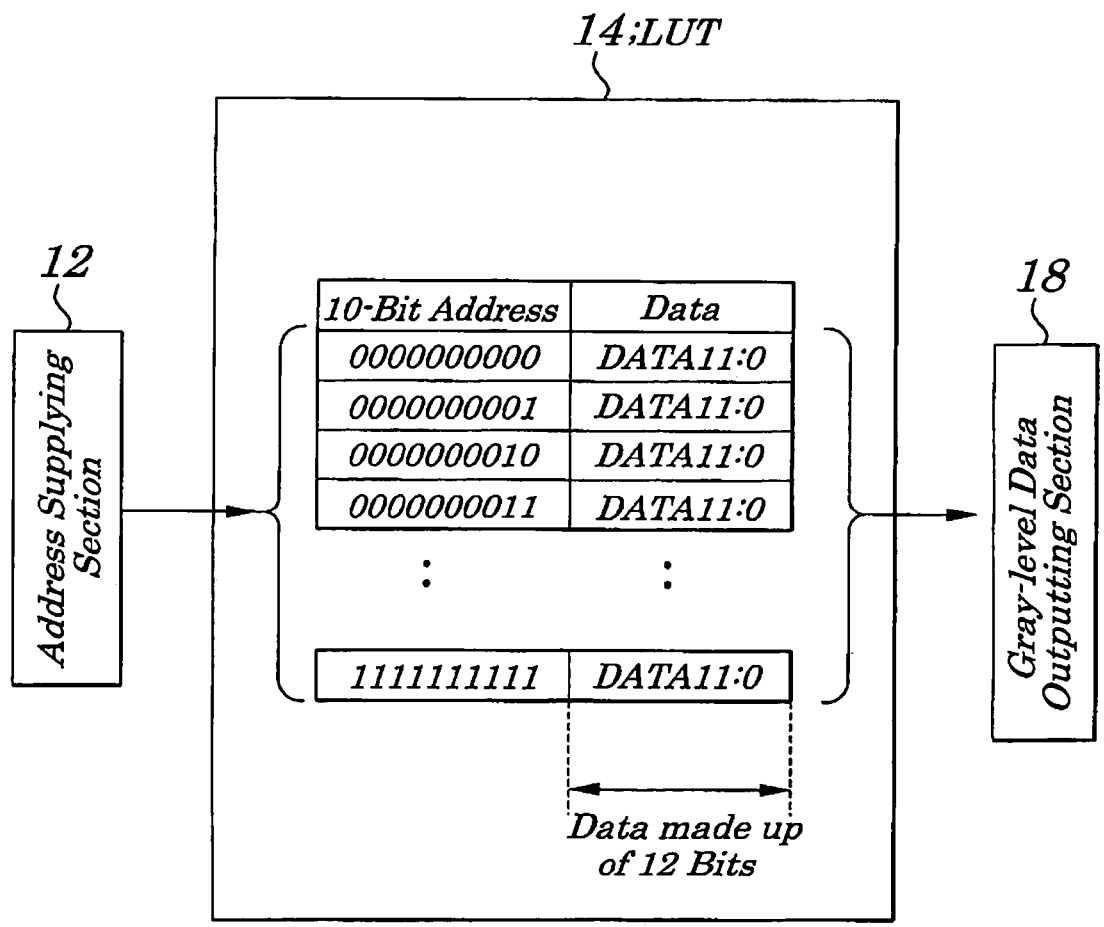
FIG. 6 is a block diagram showing electrical configurations of a liquid crystal panel driving device making up a conventional liquid crystal display device.

FIG. 4 is a block diagram showing electrical configurations of the liquid crystal panel driving device 1B making up the liquid crystal display device (not shown) according to a third embodiment of the present invention. FIG. 5 is a diagram showing configurations of a computing section of the liquid crystal panel driving device 1B according to the third embodiment. Configurations of the third embodiment differ greatly from those employed in the first or second embodiment in that expanded gray-level data of a pixel that existed one frame before is taken into consideration when expanded gray-level data of a targeted pixel is produced.

That is, in the liquid crystal panel driving device 1B of the third embodiment, as shown in FIGS. 4 and 5, a computing section 6B is made up of a main computing section 6B1 being equal to the computing section employed in the first or second embodiment, a delay creating section 6B2 to create a delay of one frame time for expanded gray-level data, and an arithmetical mean taking section 6B3. The computing section 6B is configured so that the arithmetical mean section 6B3 takes an arithmetical mean between temporary expanded gray-level data produced by the main computing section 6B1 and delayed by time for one frame by the delay creating section 6B2 and temporary expanded gray-level data produced by the main computing section 6B1 and uses expanded gray-level data to be produced by the arithmetical mean taking section 6B3 as expanded gray-level data of a targeted pixel that exists during one frame.

Operations other than described below are the same as those explained in the first embodiment. Same reference numbers are assigned to components having the same function as those in the first embodiment and their descriptions are omitted accordingly.

Next, operations in the third embodiment are explained by referring to FIGS. 4 and 5. Operations to be performed by the address supplying section 2, LUT 4 or 4A, and main computing section 6B1 are the same as those in the first or second embodiment. The third embodiment is featured by operations of the delay creating section 6B2 and arithmetical mean taking section 6B3. Their operations are explained below.

As described above, the main computing section 6B1 produces temporary expanded gray-level data of a targeted pixel that exists during an arbitrary frame. The temporary expanded gray-level data is supplied to the arithmetical mean taking section 6B3. At the same time of the supply of the temporary expanded gray-level data, temporary expanded gray-level data of a pixel corresponding to the above targeted pixel that existed before one frame is supplied from the delay creating section 6B2 to the arithmetical mean taking section 6B3. The arithmetical mean taking section 6B3 outputs an arithmetical mean between temporary expanded gray-level data of a targeted pixel and temporary expanded gray-level data of a pixel corresponding to the above targeted pixel that existed one frame before, as expanded gray-level data of a targeted pixel. Expanded gray-level data output from the arithmetical mean taking section 6B3 is supplied as data being equal to gray-level data having no compressed portions, from the gray-level data outputting section 8 to the gray-level control port of the liquid crystal panel for use in display control of the liquid crystal panel.

Thus, according to the third embodiment, since the temporary expanded gray-level data to be used in the case where gray-level data is compressed and stored in the LUT 4 is produced in the same manner as employed in the first or second embodiment, so far as the production of the temporary expanded gray-level data is concerned, the same effect obtained in the first or second embodiment can be also achieved in the third embodiment and, in addition to this, by taking an arithmetical mean between temporary expanded gray-level data that existed one frame before and temporary expanded gray-level data corresponding to a targeted frame, expanded gray-level data of the targeted frame can be used for gray-level control of the liquid crystal panel as gray-level data being accurately close to gray-level data having no compressed portion.

It is apparent that the present invention is not limited to the above embodiments but may be changed and modified without departing from the scope and spirit of the invention. For example, in the above embodiments, the case is explained in which the LUT to which access is made by high-order bits making up an address existing before being compressed is used and compressed gray-level data corresponding to the address existing before being compressed that is obtained by dropping 2 bits out of low-order bits making up the gray-level data is stored at an address of the LUT. However, the present invention is not limited to this; that is, compression of other arbitrary number of bits may be possible.

Also, at time of the interpolation, data obtained by the interpolation may not be divided into equal portions and may be divided into unequal portions. Irrespective of whether the data obtained by interpolation is divided into equal or unequal portions, the method in which interpolation is performed varies depending upon a way of using the present invention.

Moreover, in the above third embodiment, the case is explained in which temporary expanded gray-level data of a pixel occurring one frame before is considered when expanded gray-level data of a targeted pixel is produced. However, the present invention can be carried out also by considering temporary expanded gray-level data of other (surrounding) pixel. For example, the present invention can be also carried out by considering temporary expanded gray-level data of not only a pixel existing before and after a targeted pixel on the same line but also a pixel corresponding to the above targeted pixel on a line existing by one line before and after the above line when expanded gray-level data of the targeted pixel is produced. Furthermore, the present invention can be also executed by considering temporary expanded gray-level data of a pixel on a line that existed during a past frame.

The data outputting method and the device using the method disclosed in the present invention can be used in various display devices such as an information processing device, PDA (Personal Digital Assistants), display device of a video camera or a television set, or a like.

The present invention can be carried out also in a device controlled by control data being used in the same manner as in gray-level data.

What is claimed is:

1. A data outputting method for interpolating and outputting data based on an input address comprising:
    a step of, when an address is input, generating a first memory address which is made up of a specified address high-order bit portion of the input address, and obtained by excepting a specified address low-order bit portion from the input address;
    a step of reading from a data storing unit a first compressed data stored at the first memory address and a second compressed data stored at a second memory address associated with the first memory address, and the first compressed data and the second compressed data which each are compressed by excepting a specified low-order bit part from respective original data;
    a step of expanding the first compressed data and the second compressed data, based on the specified address low-order bit portion of the input address, the read first compressed data; and the read second compressed data, to obtain a first expanded data and a second expanded data;
    a step of performing interpolation between the first expanded data and the second expanded data to obtain at least one expanded interpolation data; and
    a step of outputting the at least one expanded interpolation data, and at least one of the first expanded data and the second expanded data.

2. The data outputting method according to claim 1, wherein the second memory address corresponds to a higher address next to the first memory address.

3. The data outputting method according to claim 1, wherein said data storing unit is configured to enable a plurality of pieces of data to be read by one clock.

4. The data outputting method according to claim 3, wherein said data storing unit comprises a memory which performs a double edging operation.

5. The data outputting method according to claim 1, wherein a data count of the at least one expanded interpolation data to be generated between the first expanded data and second expanded data is determined based on a bit count of the specified address low-order bit portion.

6. The outputting method according to claim 1, wherein various kinds of compressed data in data storing unit each comprise gray-level data.

7. The data outputting method of claim 1, wherein the first compressed data and the second compressed data are data of a current image.

8. A liquid crystal panel driving method for interpolating and outputting gray-level data based on an input address and driving a liquid crystal panel in accordance with the output gray-level data, the method comprising:
    a step of, when an address is input, generating a first memory address which is made up of a specified address high-order bit portion of the input address, and obtained by excepting a specified address low-order bit portion from the input address;
    a step of reading from a data storing unit a first compressed gray-level data stored at the first memory address and a second compressed gray-level data stored at a second memory address associated with the first memory address, and the first compressed gray-level data and the second compressed gray-level data which each are compressed by excepting a specified low-order bit part from respective original gray-level data;
    a step of expanding the first compressed gray-level data and the second compressed gray-level data, based on the specified address low-order bit portion of the input address, the read first compressed gray-level data, and the read second compressed gray-level data, to obtain a first expanded gray-level data and a second expanded gray-level data;
    a step of performing interpolation between the first expanded gray-level data and the second expanded gray-level data to obtain at least one expanded interpolation gray-level data; and
    a step of outputting the at least one expanded interpolation gray-level data, and at least one of the first expanded gray-level data and the second expanded gray-level data to drive said liquid crystal panel.

9. The liquid crystal panel driving method according to claim 8, wherein the first expanded gray-level data corresponds to a first pixel, the second expanded gray-level data corresponds to a second pixel, and the at least one expanded interpolation gray-level corresponds to at least one pixel disposed between the first pixel and the second pixel on the liquid crystal display panel.

10. A liquid crystal displaying method for interpolating and outputting gray-level data based on an input address and driving a liquid crystal panel in accordance with the output gray-level data to display an image, the method comprising:
    a step of, when an address is input, generating a first memory address which is made up of a specified address high-order bit portion of the input address, and obtained by excepting a specified address low-order bit portion from the input address;
    a step of reading from a data storing unit a first compressed gray-level data stored at the first memory address and a second compressed gray-level data stored at a second memory address associated with the first memory address, and the first compressed gray-level data and the second compressed gray-level data which each are compressed by excepting a specified low-order bit part from respective original gray-level data;
    a step of expanding the first compressed gray-level data and the second compressed gray-level data, based on the specified address low-order bit portion of the input address, the read first compressed gray-level data, and the read second compressed gray-level data, to obtain a first expanded gray-level data and a second expanded gray-level data;
    a step of performing interpolation between the first expanded gray-level data and the second expanded gray-level data to obtain at least one expanded interpolation gray-level data to display the image; and
    a step of outputting the at least one expanded interpolation gray-level data, and at least one of the first expanded gray-level data and the second expanded gray-level data to drive said liquid crystal panel.

11. The liquid crystal displaying method according to claim 10, wherein the first expanded gray-level data corresponds to a first pixel, the second expanded gray-level data corresponds to a second pixel, and the at least one expanded interpolation gray-level data corresponds to at least one pixel disposed between the first pixel and the second pixel in the image.

12. A data outputting device for interpolating and outputting data based on an input address comprising:
- a data storing unit to store compressed data in advance;
- a memory address generating unit to generate, when an address is input, a first memory address which is made up of a specified address high-order bit portion of the input address, and obtained by excepting a specified address low-order bit portion from the input address;
- a reading unit to read from said data storing unit a first compressed data stored at the first memory address and a second compressed data stored at a second memory address associated with the first memory address, and the first compressed data and the second compressed data which each are compressed by excepting a specified low-order bit part from respective original data;
- a data expanding unit to expand the first compressed data and the second compressed data, based on the specified address low-order bit portion of the input address, the read first compressed data, and the read second compressed data, to obtain a first expanded data and a second expanded data;
- an interpolating unit to perform interpolation between the first expanded data and the second expanded data to obtain at least one expanded interpolation data; and
- an outputting unit to output the at least one expanded interpolation data, and at least one of the first expanded data and the second expanded data.

13. The data outputting device according to claim 12, wherein the second memory address corresponds to a higher address next to the first memory address.

14. The data outputting device according to claim 12, wherein said data storing unit is configured to enable a plurality of pieces of data to be read by one clock.

15. The data outputting device according to claim 14, wherein said data storing unit comprises a memory which performs a double edging operation.

16. The data outputting device according to claim 12, wherein a data count of the at least one expanded interpolation data to be generated between the first expanded data and second expanded data is determined based on a bit count of the specified address low-order bit portion.

17. The outputting method according to claim 12, wherein various kinds of compressed data in the data storing unit each comprise gray-level data.

18. The data outputting device of claim 12, wherein the first compressed data and the second compressed data are data of a current image.

19. A liquid crystal panel driving device for interpolating and outputting gray-level data based on an input address and driving a liquid crystal panel in accordance with the output gray-level data, the device comprising:
- a data storing unit to store compressed gray-level data in advance;
- a memory address generating unit to generate, when an address is input, a first memory address which is made up of a specified address high-order bit portion of the input address, and obtained by excepting a specified address low-order bit portion from the input address;
- a reading unit to read from said data storing unit a first compressed gray-level data stored at the first memory address and a second compressed gray-level data stored at a second memory address associated with the first memory address, and the first compressed gray-level data and the second compressed gray-level data which each are compressed by excepting a specified low-order bit part from respective original gray-level data;
- a data expanding unit to expand the first compressed gray-level data and the second compressed gray-level data, based on the specified address low-order bit portion of the input address, the read first compressed gray-level data, and the read second compressed gray-level data, to obtain a first expanded gray-level data and a second expanded gray-level data;
- an interpolating unit to perform interpolation between the first expanded gray-level data and the second expanded gray-level data to obtain at least one expanded interpolation gray-level data; and
- an outputting unit to output the at least one expanded interpolation gray-level data, and at least one of the first expanded gray-level data and the second expanded gray-level data to drive said liquid crystal panel.

20. The liquid crystal panel driving device according to claim 19, wherein the first expanded gray-level data corresponds to a first pixel, the second expanded gray-level data corresponds to a second pixel, and the at least one expanded interpolation gray-level data corresponds to at least one pixel disposed between the first pixel and the second pixel on the liquid crystal panel.

21. A liquid crystal display device for interpolating and outputting gray-level data based on an input address and driving a liquid crystal panel in accordance with the output gray-level data to display an image, the device comprising:
- a data storing unit to store compressed gray-level data in advance;
- a memory address generating unit to generate, when an address is input, a first memory address which is made up of a specified address high-order bit portion of the input address, and obtained by excepting a specified address low-order bit portion from the input address;
- a reading unit to read from said data storing unit a first compressed gray-level data stored at the first memory address and a second compressed gray-level data stored at a second memory address associated with the first memory address, and the first compressed gray-level data and the second compressed gray-level data which each are compressed by excepting a specified low-order bit part from respective original gray-level data;
- a data expanding unit to expand the first compressed gray-level data and the second compressed gray-level data, based on the specified address low-order bit portion of the input address, the read first compressed gray-level data, and the read second compressed gray-level data, to obtain a first expanded gray-level data and a second expanded gray-level data;
- an interpolating unit to perform interpolation between the first expanded gray-level data and the second expanded gray-level data to obtain at least one expanded interpolation gray-level data; and
- an outputting unit to output the at least one expanded interpolation gray-level data, and at least one of the first expanded gray-level data and the second expanded gray-level data to drive said liquid crystal panel.

22. The liquid crystal display device according to claim 21, wherein the first expanded gray-level data corresponds to a first pixel, the second expanded gray-level data corresponds to a second pixel, and the at least one expanded interpolation gray-level data corresponds to at least one pixel disposed between the first pixel and the second pixel in the image.

23. A data outputting device for interpolating and outputting data based on an input address comprising:
- data storing means for storing compressed data in advance;
- memory address generating means for generating, when and address is input, a first memory address which is made up of a specified address high-order bit portion of the input address, and obtained by excepting a specified address low-order bit portion from the input address;
- reading means for reading from said data storing means a first compressed data stored at the first memory address and a second compressed data stored at a second memory address associated with the first memory address, and the first compressed data and the second compressed data which each are compressed by excepting a specified low-order bit part from respective original data;
- data expanding means for expanding the first compressed data and the second compressed data, based on the specified address low-order bit portion of the input address, the read first compressed data, and the read second compressed data, to obtain a first expanded data and a second expanded data;
- interpolating means for performing interpolation between the first expanded data and the second expanded data to obtain at least one expanded interpolation data; and
- outputting means for outputting the at least one expanded interpolation data, and at least one of the first expanded data and the second expanded data.

24. The data outputting device according to claim 23, wherein the second memory address corresponds to a higher address next to the first memory address.

25. The data outputting device according to claim 23, wherein said data storing means is configured for enabling a plurality of pieces of data to be read by one clock.

26. The data outputting device according to claim 25, wherein said data storing means comprises a memory which performs a double edging operation.

27. The data outputting device according to claim 23, wherein a data count of the at least one expanded interpolation data to be generated between the first expanded data and second expanded data is determined based on a bit count of the specified address low-order bit portion.

28. The data outputting device of claim 23, wherein the first compressed data and the second compressed data are data of a current image.

29. A liquid crystal panel driving device for interpolating and outputting gray-level data based on an input address and driving a liquid crystal panel in accordance with the output gray-level data, the device comprising:
- data storing means for storing compressed gray-level data in advance;
- memory address generating means for generating, when an address is input, a first memory address which is made up of a specified address high-order bit portion of the input address, and obtained by excepting a specified address low-order bit portion from the input address;
- reading means for reading from said data storing means a first compressed gray-level data stored at the first memory address and a second compressed gray-level data stored at a second memory address associated with the first memory address, and the first compressed gray-level data and the second compressed gray-level data which each are compressed by excepting a specified low-order bit part from respective original gray-level data;
- data expanding means for expanding the first compressed gray-level data and the second compressed gray-level data, based on the specified address low-order bit portion of the input address, the read first compressed gray-level data, and the read second compressed gray-level data, to obtain a first expanded gray-level data and a second expanded gray-level data;
- interpolating means for performing interpolation between the first expanded gray-level data and the second expanded gray-level data to obtain at least one expanded interpolation gray-level data; and
- outputting means for outputting the at least one expanded interpolation gray-level data, and at least one of the first expanded gray-level data and the second expanded gray-level data to drive said liquid crystal panel.

30. The liquid crystal panel driving device according to claim 29, wherein the first expanded gray-level data corresponds to a first pixel, the second expanded gray-level data corresponds to a second pixel, and the at least one expanded interpolation gray-level data corresponds to at least one pixel disposed between the first pixel and the second pixel on the liquid crystal panel.

31. A liquid crystal display device for interpolating and outputting gray-level data based on an input address and driving a liquid crystal panel in accordance with the output gray-level data to display an image, the device comprising:
- data storing means for storing compressed gray-level data in advance;
- memory address generating means for generating, when an address is input, a first memory address which is made up of a specified address high-order bit portion of the input address, and obtained by excepting a specified address low-order bit portion from the input address;
- reading means for reading from said data storing means a first compressed gray-level data stored at the first memory address and a second compressed gray-level data stored at a second memory address associated with the first memory address, and the first compressed gray-level data and the second compressed gray-level data which each are compressed by excepting a specified low-order bit part from respective original gray-level data;
- data expanding means for expanding the first compressed gray-level data and the second compressed gray-level data, based on the specified address low-order bit portion of the input address, the read first compressed gray-level data, and the read second compressed gray-level data, to obtain a first expanded gray-level data and a second expanded gray-level data;
- interpolating means for performing interpolation between the first expanded gray-level data and the second expanded gray-level data to obtain at least one expanded interpolation gray-level data; and
- outputting means for outputting the at least one expanded interpolation gray-level data, and at least one of the first expanded gray-level data and the second expanded gray-level data to drive said liquid crystal panel.

* * * * *